United States Patent
Bader et al.

(10) Patent No.: US 12,148,942 B2
(45) Date of Patent: Nov. 19, 2024

(54) POWER TOOL HAVING A PROTECTIVE GUARD-BRACKET DEVICE FOR RECHARGEABLE BATTERIES

(71) Applicant: Hilti Aktiengesellschaft, Schaan (LI)

(72) Inventors: Thomas Bader, Landsberg am Lech (DE); Torsten Tussing, Obermeitingen (DE); Christian Laudensack, Adelsried (DE); Sören Schöpke, Igling (DE); Matthias Doberenz, Obermeitingen (DE); Michael Brandner, Landsberg am Lech / Erpfting (DE)

(73) Assignee: Hilti Aktiengesellschaft

( * ) Notice: Subject to any disclaimer, the term of this patent is extended or adjusted under 35 U.S.C. 154(b) by 143 days.

(21) Appl. No.: 17/799,690

(22) PCT Filed: Feb. 15, 2021

(86) PCT No.: PCT/EP2021/053594
§ 371 (c)(1),
(2) Date: Aug. 15, 2022

(87) PCT Pub. No.: WO2021/175572
PCT Pub. Date: Sep. 10, 2021

(65) Prior Publication Data
US 2023/0063991 A1    Mar. 2, 2023

(30) Foreign Application Priority Data
Mar. 2, 2020 (EP) .................................. 20160338

(51) Int. Cl.
*H01M 50/242* (2021.01)
*B25D 17/04* (2006.01)
(Continued)

(52) U.S. Cl.
CPC .......... *H01M 50/242* (2021.01); *B25D 17/04* (2013.01); *B25F 5/02* (2013.01); *H01M 50/204* (2021.01);
(Continued)

(58) Field of Classification Search
CPC ............ H01M 50/242; H01M 50/247; H01M 50/204; H01M 2220/30; B25D 17/04;
(Continued)

(56) References Cited

U.S. PATENT DOCUMENTS

| 8,148,000 | B2 * | 4/2012 | Furuta | ................. | H01M 50/244 206/703 |
| 10,688,644 | B2 * | 6/2020 | Iida | ........................ | H02K 7/145 |

(Continued)

FOREIGN PATENT DOCUMENTS

| DE | 102018210189 A1 | 12/2019 |
| EP | 2080594 A1 | 7/2009 |

(Continued)

OTHER PUBLICATIONS

International Search Report of PCT/EP2021/053594 dated Apr. 23, 2021.

*Primary Examiner* — Joshua G Kotis
(74) *Attorney, Agent, or Firm* — Davidson Kappel LLC

(57) ABSTRACT

A power tool, in particular a chipping hammer, containing a first and second side handle and a tool housing having an interface for releasably receiving and holding a first and second rechargeable battery, wherein a side-handle axis extending through the first and second side handles is arranged substantially perpendicularly to a working axis extending through the tool housing. The power tool contains a protective apparatus for protecting the first and second rechargeable batteries, the protective apparatus having an (Continued)

internal volume for at least partially receiving the first and second rechargeable batteries.

16 Claims, 10 Drawing Sheets

(51) Int. Cl.
  *B25F 5/02* (2006.01)
  *H01M 50/204* (2021.01)
  *H01M 50/247* (2021.01)

(52) U.S. Cl.
  CPC .. *B25D 2250/095* (2013.01); *B25D 2250/121* (2013.01); *H01M 50/247* (2021.01); *H01M 2220/30* (2013.01)

(58) Field of Classification Search
  CPC ........ B25D 2250/095; B25D 2250/121; B25F 5/02
  See application file for complete search history.

(56) References Cited

U.S. PATENT DOCUMENTS

| | | | |
|---|---|---|---|
| 10,792,780 B2* | 10/2020 | Masatoshi | B24B 47/12 |
| 10,888,989 B2* | 1/2021 | Kawakami | B25F 5/02 |
| 10,913,141 B2* | 2/2021 | Iida | B25D 17/24 |
| 11,865,679 B2* | 1/2024 | Seith | B25B 21/02 |
| 2015/0367497 A1* | 12/2015 | Ito | B25F 5/02 |
| | | | 173/217 |
| 2018/0099399 A1* | 4/2018 | Sunabe | B25F 5/02 |
| 2019/0199101 A1* | 6/2019 | Hennesy | H02J 7/0031 |
| 2019/0232478 A1 | 8/2019 | Zawisza et al. | |
| 2021/0078203 A1* | 3/2021 | Sumi | B28D 1/04 |
| 2021/0170501 A1* | 6/2021 | Barezzani | E01B 31/24 |
| 2021/0197356 A1* | 7/2021 | Chung | B25F 5/008 |
| 2021/0354219 A1* | 11/2021 | Fu | B23D 45/16 |
| 2022/0117156 A1* | 4/2022 | Qiao | H01M 50/244 |

FOREIGN PATENT DOCUMENTS

| | | | |
|---|---|---|---|
| JP | 2016165783 A | * | 9/2016 |
| JP | 2016165784 A | | 9/2016 |

* cited by examiner

POWER TOOL HAVING A PROTECTIVE GUARD-BRACKET DEVICE FOR RECHARGEABLE BATTERIES

The present invention relates to a power tool, in particular a chipping hammer, containing a first and second side handle and a tool housing having an interface device for releasably receiving and holding a first and second rechargeable battery, wherein a side-handle axis extending through the first and second side handles is arranged substantially perpendicularly to a working axis extending through the tool housing.

BACKGROUND

Hammer drills and/or chipping hammers of the type mentioned at the beginning are known in principle from the prior art.

SUMMARY OF THE INVENTION

If rechargeable batteries are used to supply the power tool with electrical energy, it is advantageous that particular measures for protecting the rechargeable batteries from impacts and other mechanical effects are taken. Rechargeable batteries can be quite sensitive, or react in a fault-prone manner to such mechanical effects, such as impacts, for example.

Protective apparatuses, known from the prior art, for rechargeable batteries on power tools are usually insufficient and complex and can represent an obstacle when using the battery-operated power tool.

It is an object of the present invention to provide a power tool that contains an improved protective apparatus for rechargeable batteries for supplying a power tool with electrical energy.

The present invention provides a power tool, in particular a chipping hammer, containing a first and second side handle and a tool housing having an interface device for releasably receiving and holding a first and second rechargeable battery, wherein a side-handle axis extending through the first and second side handles is arranged substantially perpendicularly to a working axis extending through the tool housing. According to the invention, it contains a protective apparatus for protecting the first and second rechargeable batteries, said protective apparatus having an internal volume for at least partially receiving the first and second rechargeable batteries.

According to one advantageous configuration of the present invention, it may be possible that the protective apparatus has a length of between 350 mm and 450 mm, in particular 400 mm, in a direction substantially parallel to the side-handle axis. As a result, the protective apparatus has a sufficient length to receive and hold two rechargeable batteries.

According to a further advantageous configuration of the present invention, it may be possible that the protective apparatus contains at least one bearing surface, wherein a plane extending through the at least one bearing surface is arranged substantially parallel to the side-handle axis and/or perpendicularly to the working axis. The power tool can be set down relatively safely on the bearing surface when the power tool is turned over and placed upside down. Safe setting down of the power tool or placing it upside down is advantageous in particular when, for example, the tool is removed from the power tool.

According to one advantageous configuration of the present invention, it may be possible that at least one auxiliary handle is contained on the tool housing, wherein the at least one auxiliary handle is arranged on the tool housing such that an auxiliary-handle axis extending through the at least one auxiliary handle is arranged substantially parallel to the side-handle axis and/or perpendicularly to the working axis.

According to a further advantageous configuration of the present invention, it may be possible that the protective apparatus contains a first frame element and a second frame element, wherein both the first and the second frame element each contain a top side and an underside, and wherein the first and second frame elements are able to be connected releasably to one another at the respective top side and the first and second frame elements are able to be connected releasably to the tool housing at the respective underside. This results in a modular construction for the protective apparatus. If the first or second frame element is damaged, the frame element damaged in each case can be replaced in a modular and simple manner.

Further advantages will become apparent from the following description of the figures. Various exemplary embodiments of the present invention are illustrated in the figures. The figures, the description and the claims contain numerous features in combination. A person skilled in the art will expediently also consider the features individually and combine them to form useful further combinations.

BRIEF DESCRIPTION OF THE DRAWINGS

In the figures, identical and similar components are denoted by the same reference signs. In the figures.

DETAILED DESCRIPTION

Figure 1:
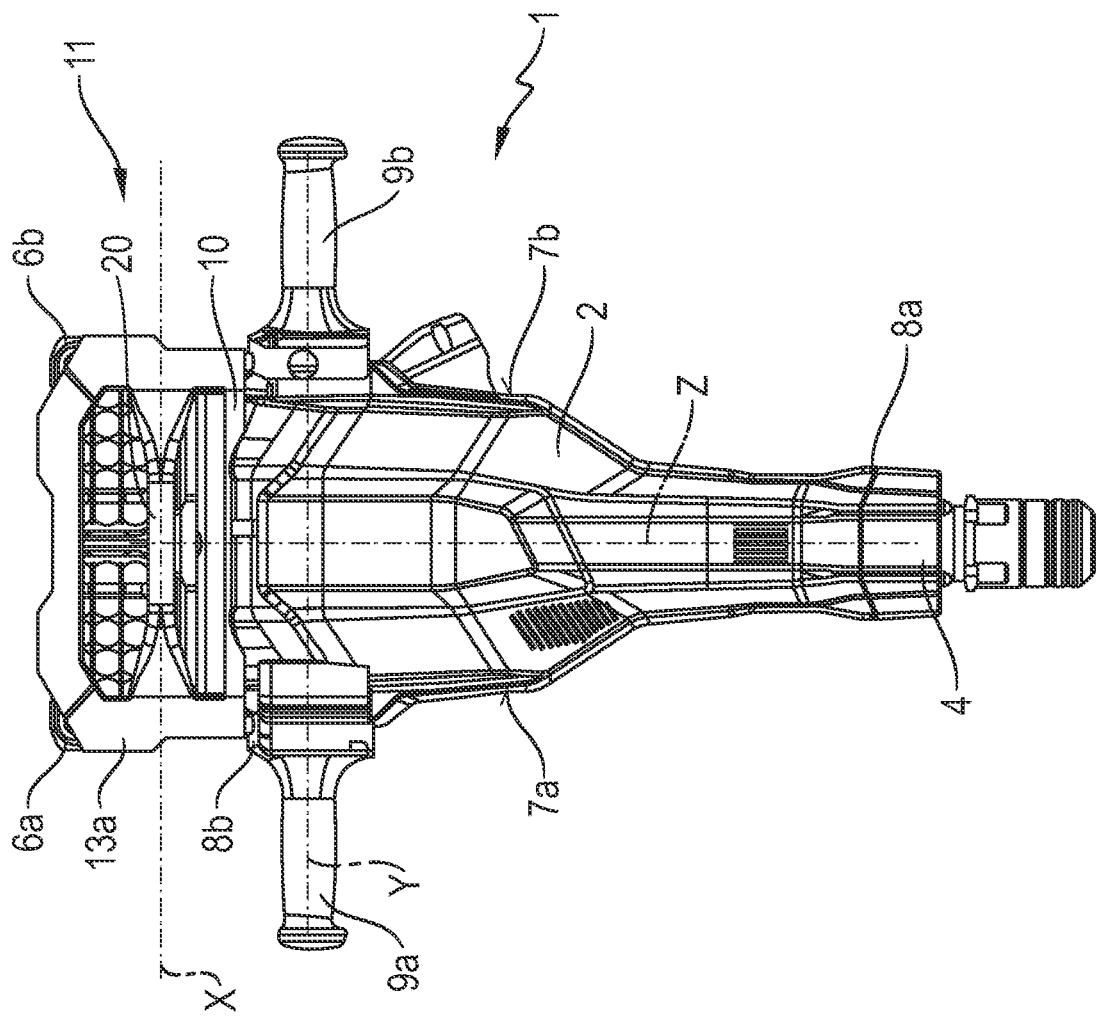
FIG. 1 shows a rear view of a power tool having a first and second side handle and a protective apparatus for protecting a first and second rechargeable battery according to a first embodiment.
Figure 2:
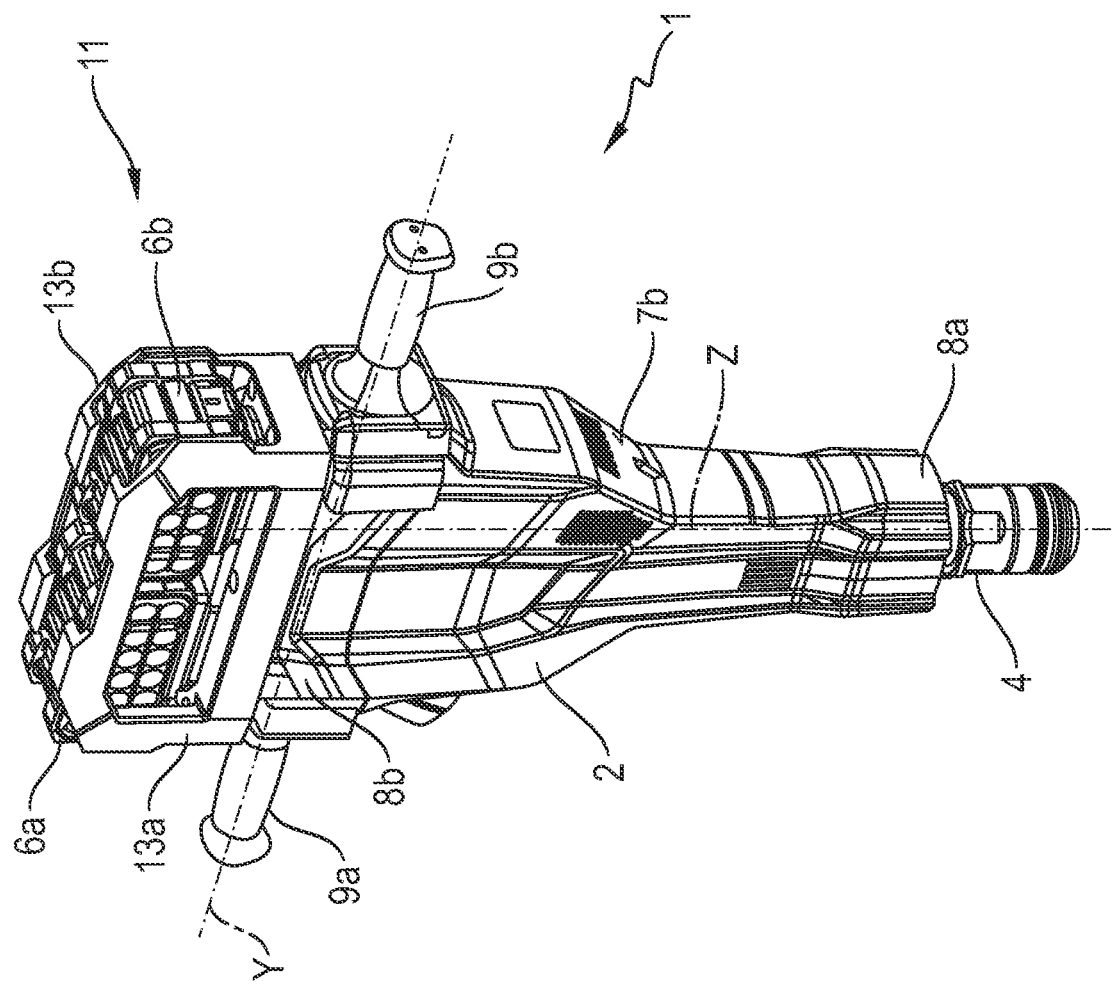
FIG. 2 shows a perspective front view of the power tool having the first and second side handles and the protective apparatus for protecting the first and second rechargeable batteries according to the first embodiment.

FIGS. 1 and 2 show a power tool 1 in the form of a chipping hammer. The power tool 1 can also be a hammer drill, combination hammer or the like, however.

The power tool 1 contains primarily a tool housing 2, a first side handle 9a, a second side handle 9b, a tool fitting device 4 and a protective apparatus 11 for protecting a first and second rechargeable battery 6a, 6b.

Contained inside the tool housing 2 are primarily a drive, an impact mechanism and a control apparatus. The tool housing 2 has a first side face 7a, a second side face 7b, a bottom end 8a and a top end 8b.

As is apparent from FIG. 1, a working axis Z extends through the middle of the power tool.

The first side handle 9a is positioned on the first side face 7a of the tool housing 2 and the second side handle 9b is positioned on the second side face 7b of the tool housing 2. The two side handles 9a, 9b are used for holding and guiding the power tool 1.

As is likewise shown in FIG. 1, a side-handle axis Y extends through the middle of the first and second side handles 9a, 9b. The side-handle axis Y and the working axis Z are substantially perpendicular to one another.

Figure 3:
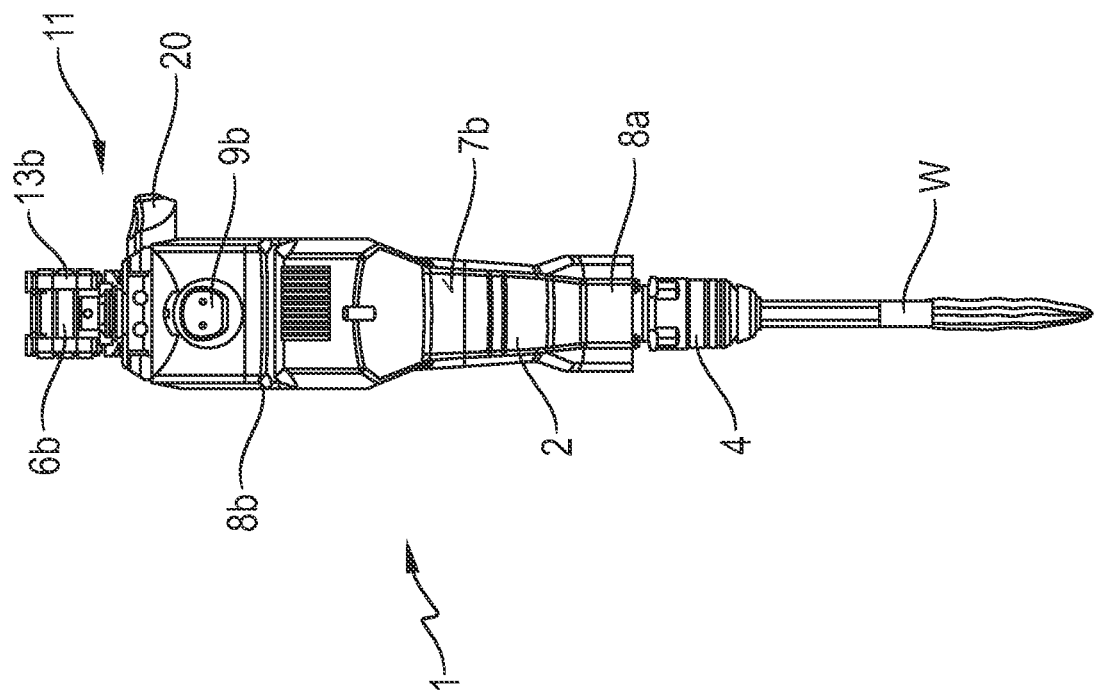
FIG. 3 shows a side view of the power tool.

The tool fitting device 4 is positioned at the bottom end 8a of the tool housing 2. The tool fitting device 4 serves for releasably receiving and holding a tool W. In the present case, the tool W is configured as a chisel, cf. FIG. 3.

The drive can be configured as an electric motor and is connected to the impact mechanism such that the drive drives the impact mechanism to generate impact impulses. The impact mechanism is in turn connected to the tool fitting device 4 such that the impact impulses generated by the impact mechanism are transmitted to the tool W located in the tool fitting device 4.

Provided at the top end 8b of the tool housing 2 is an interface device 10 and the protective apparatus 11 for protecting the first and second rechargeable batteries 6a, 6b. As illustrated in particular in FIGS. 4 and 6, the interface device 10 contains a first rechargeable-battery connection point 12a and a second rechargeable-battery connection point 12b. With the aid of the first rechargeable-battery connection point 12a, the first rechargeable battery 6a can be connected releasably to the power tool 1 such that the electrical energy stored in the first rechargeable battery 6a can be provided to the loads of the power tool 1. With the aid of the second rechargeable-battery connection point 12b, the second rechargeable battery 6b can be connected releasably to the power tool 1 such that the electrical energy stored in the second rechargeable battery 6b can be provided to the loads of the power tool 1. The loads for the electrical energy can be the drive, the control apparatus or the like.

Figure 6:
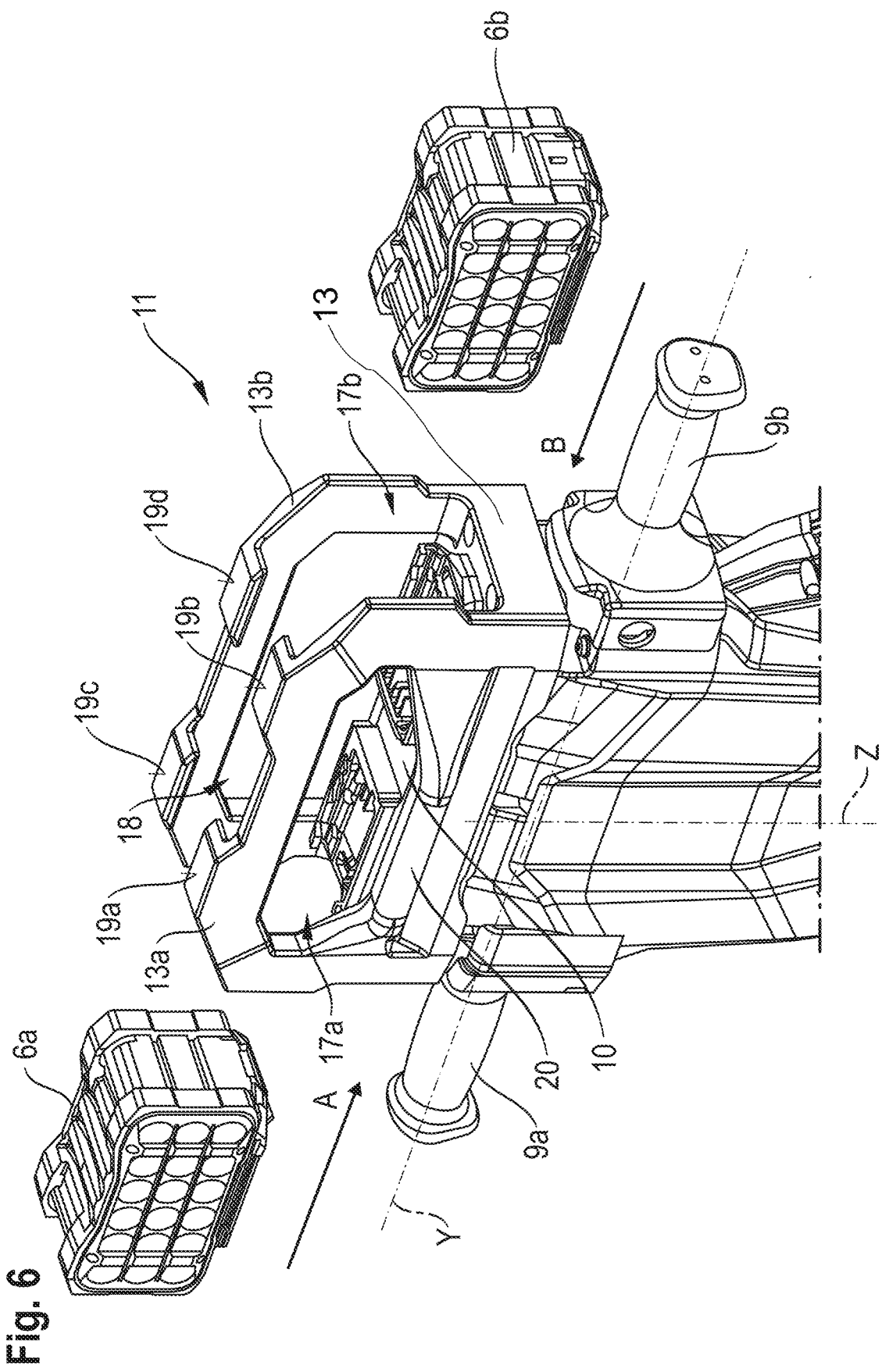
FIG. 6 shows a further perspective rear view of the power tool with the first and second rechargeable batteries in a position outside the protective apparatus according to the first embodiment.

As is apparent in particular from FIG. 6, the protective apparatus 11, for protecting the first and second rechargeable batteries 6a, 6b, contains a frame 13 with a first and second frame element 13a, 13b. As illustrated in particular in FIGS. 9 and 10, both the first frame element 13a and the second frame element 13b are configured as a U-shaped bracket. The first and second frame elements 13a, 13b configured as U-shaped brackets in this case each contain a top side 14, an underside 15, an inner side 16a and an outer side 16b. The two frame elements 13a, 13b, configured as U-shaped brackets, of the protective apparatus 11 form, in their arrangement, an internal volume IV that defines the interior region of the protective apparatus 11. The protective apparatus 11 consisting primarily of the two frame elements 13a, 13b contains a first opening 17a and a second opening 17b. The first rechargeable battery 6a can be introduced into the interior of the protective apparatus through the first opening 17a and the second rechargeable battery 6b can be introduced into the interior of the protective apparatus through the second opening 17b, such that the two rechargeable batteries 6a, 6b are located in the internal volume IV of the protective apparatus 11. The protective apparatus 11 is configured such that the first and second openings 17a, 17b face in opposite directions.

According to a first embodiment of the protective apparatus 11, the underside 15 of the first and second frame elements 13a, 13b configured as U-shaped brackets is connected firmly to the top end 8b of the tool housing 2. Furthermore, the two frame elements 13a, 13b are not connected together at their respective top sides 14 and have a certain clearance 18, cf. FIGS. 4 and 6. Since the two frame elements 13a, 13b are not connected together at their respective top sides 14 and the clearance 18, located at the top side 14, between the two frame elements is configured in a continuous manner, the two frame elements 13a, 13b can be moved with respect to one another to a certain extent at the top side 14 thereof. The two frame elements 13a, 13b thus exhibit a degree of flexibility.

According to an alternative embodiment of the protective apparatus 11, the two frame elements 13a, 13b can be connected together at their respective top sides 14 by additional bracing struts or in the form of a continuous plate. The bracing struts or plate can in this case be formed from a flexible or firm material. If the bracing struts or plate are formed from a flexible material, the two frame elements 13a, 13b can move relative to one another. If, however, the bracing struts or plate are formed from a firm material, the two frame elements 13a, 13b cannot move relative to one another and form a robust construction.

As is apparent from FIG. 6, the first and second rechargeable-battery connection points 12a, 12b are positioned inside the protective apparatus 11, or in the internal volume IV of the protective apparatus 11. As is likewise apparent, the two rechargeable-battery connection points 12a, 12b are oriented with respect to one another such that the first and second rechargeable batteries 6a, 6b are introduced into the corresponding rechargeable-battery connection points 12a, 12b in opposite directions. The first rechargeable battery 6a is introduced into the interior of the protective apparatus 11, and into the rechargeable-battery connection point 12a, through the first opening 17a in the direction A, and the second rechargeable battery 6b is introduced into the interior of the protective apparatus 11, and into the rechargeable-battery connection point 12b, through the second opening 17b in the direction B, cf. FIGS. 4 to 7. The direction A extends in this case substantially parallel to the side-handle axis Y and perpendicularly to the working axis Z.

Figure 4:
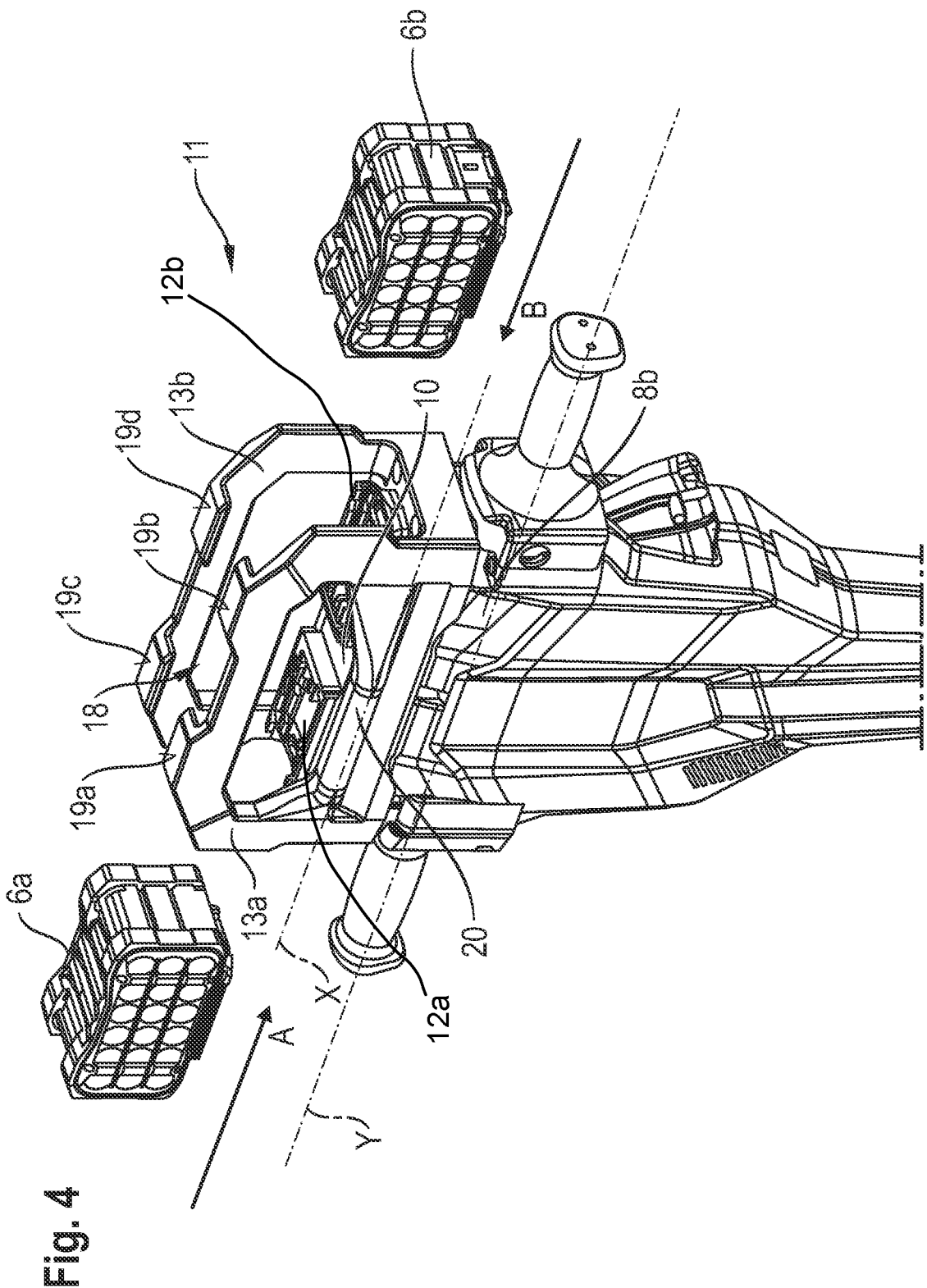
FIG. 4 shows a perspective rear view of the power tool with the first and second rechargeable batteries in a position outside the protective apparatus.
Figure 7:
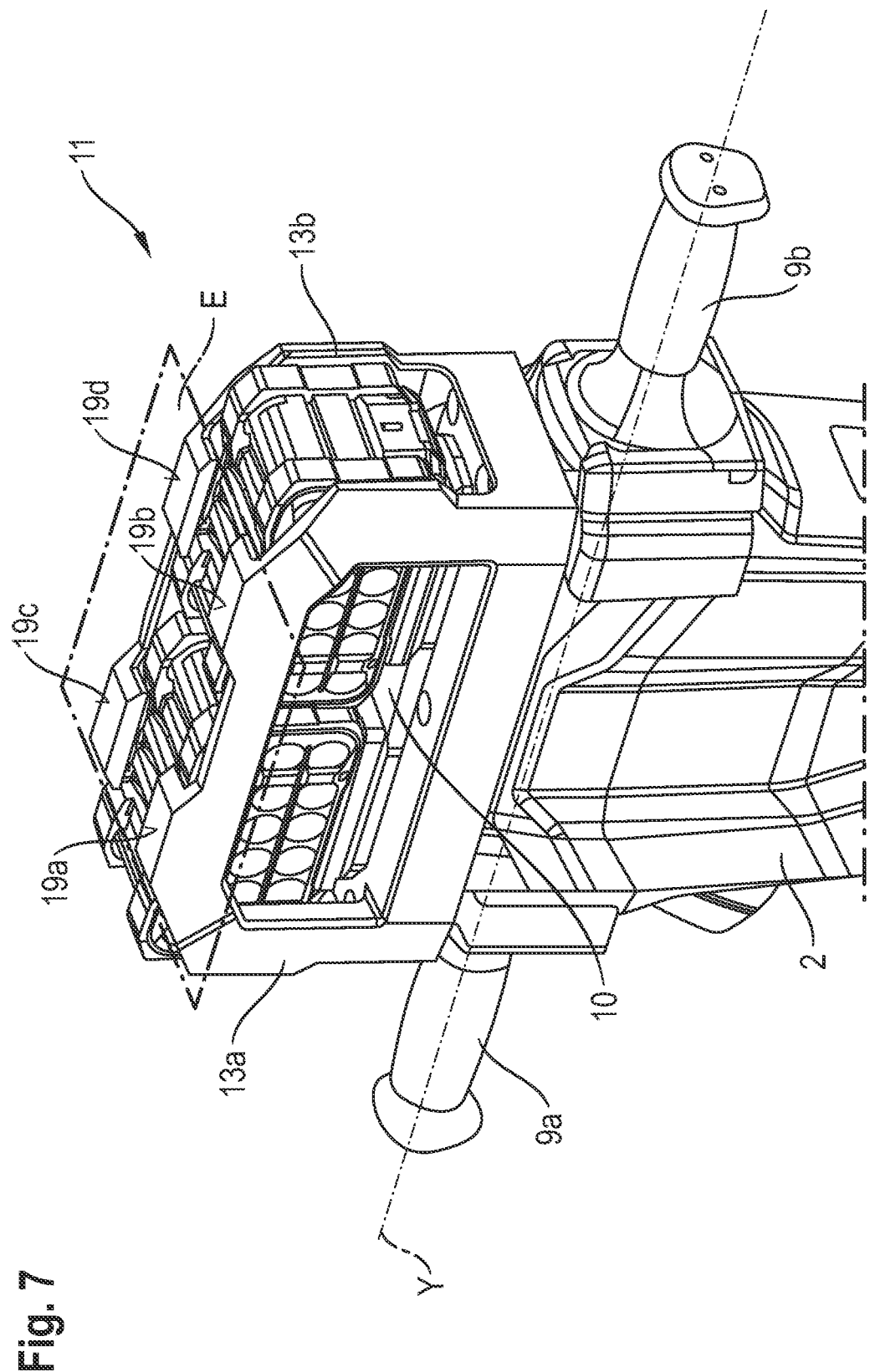
FIG. 7 shows a perspective front view of the power tool with the first and second rechargeable batteries in a position inside the protective apparatus according to the first embodiment.

Furthermore, a first, second, third and fourth bearing surface 19a, 19b, 19c, 19d are provided on the top side 14 of the first and second frame elements 13a, 13b configured as U-shaped brackets according to the first embodiment of the protective apparatus 11, cf. FIGS. 4, 6 and 7. The first and second bearing surfaces 19a, 19b are in this case positioned on the top side 14 of the first frame element 13a and the third and fourth bearing surfaces 19c, 19d are positioned on the top side 14 of the second frame element 13b, cf. FIGS. 4 and 6. The four bearing surfaces 19a, 19b, 19c, 19d are configured in a planar manner and arranged parallel to one another.

Figure 5:
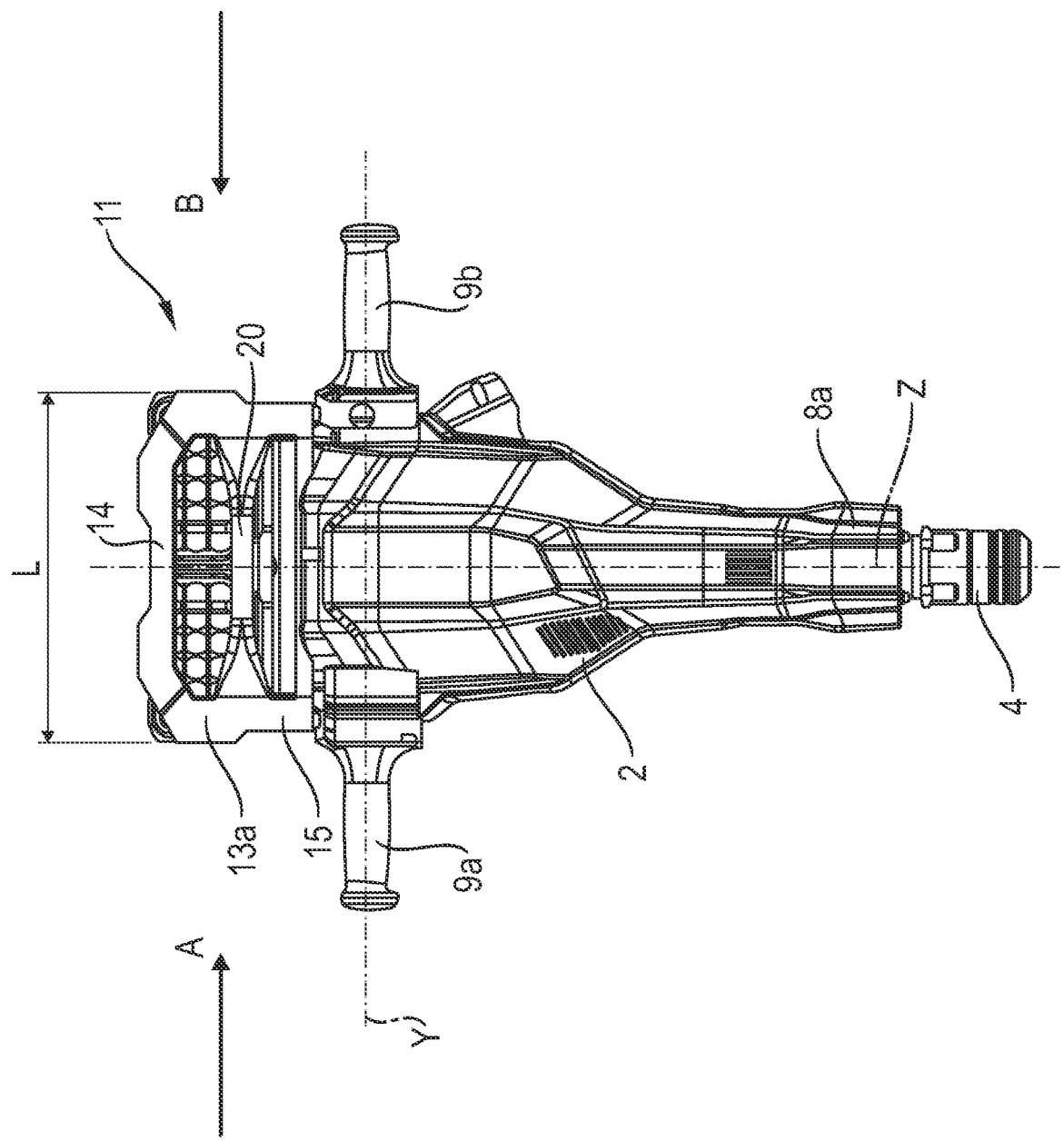
FIG. 5 shows a rear view of the power tool having the first and second side handles and the protective apparatus for protecting the first and second rechargeable batteries according to the first embodiment, and an auxiliary handle.

As illustrated in FIG. 5, the protective apparatus 11 has a certain length L in the direction A and in the direction B. The length L is in this case between 350 mm and 450 mm. In the present and preferred case, the length L has a value of 400 mm. It should be noted that the length L corresponds at least to the distance from the rear side RS of the first rechargeable battery 6a to the rear side RS of the second rechargeable battery 6b when the first rechargeable battery 6a is in the first rechargeable-battery connection point 12a and the second rechargeable battery 6b is in the second rechargeable-battery connection point 12b. It is also possible here for the length L to correspond at least to twice the length of the housing of the first or second rechargeable battery 6a, 6b when the first and second rechargeable batteries 6a, 6b have a virtually identical housing length. The defined value for the length L makes it possible to ensure that the first rechargeable battery 6a does not project laterally out of the protective apparatus 11 in the direction B and that the second rechargeable battery 6b does not project laterally out of the protective apparatus 11 in the direction A. Since the two rechargeable batteries 6a, 6b do not project laterally out of the protective apparatus 11 on account of the defined length L, the rechargeable batteries 6a, 6b do not come into contact with the substrate if the power tool 1 is dropped. If the power tool 1 were dropped, only the protective apparatus 11 and not the rechargeable batteries 6a, 6b would come into contact with the substrate and thus dissipate the suddenly arising impact energy or impact impulse into the protective apparatus 11.

As is apparent from FIG. 7, a plane E extends through the four bearing surfaces 19a, 19b, 19c, 19d. The plane extends in this case substantially parallel to the side-handle axis Y and perpendicularly to the working axis Z. The four bearing surfaces 19a, 19b, 19c, 19d serve for safely and stably setting down the power tool 1 when the power tool 1 is positioned in an inverted manner, i.e. placed upside down, in order to remove the tool W from the tool fitting device 4.

Furthermore, the power tool 1 contains an auxiliary handle 20, cf. FIGS. 1, 3, 4, 5 and 6. The auxiliary handle 20 is configured as a bow and contains a first end 20a, a second end 20b and a gripping region 20c arranged between the first and second ends 20a, 20b. An auxiliary-handle axis X extending through the auxiliary handle 20 is arranged substantially parallel to the side-handle axis Y and/or perpendicularly to the working axis Z. By way of the auxiliary handle 20, the power tool 1 can be held and guided. In the present exemplary embodiment, the auxiliary handle 20 is positioned on the protective apparatus 11. To this end, the first and second ends 20a, 20b of the auxiliary handle 20 configured as a bow are fastened to the first frame element 13a.

Figure 8:
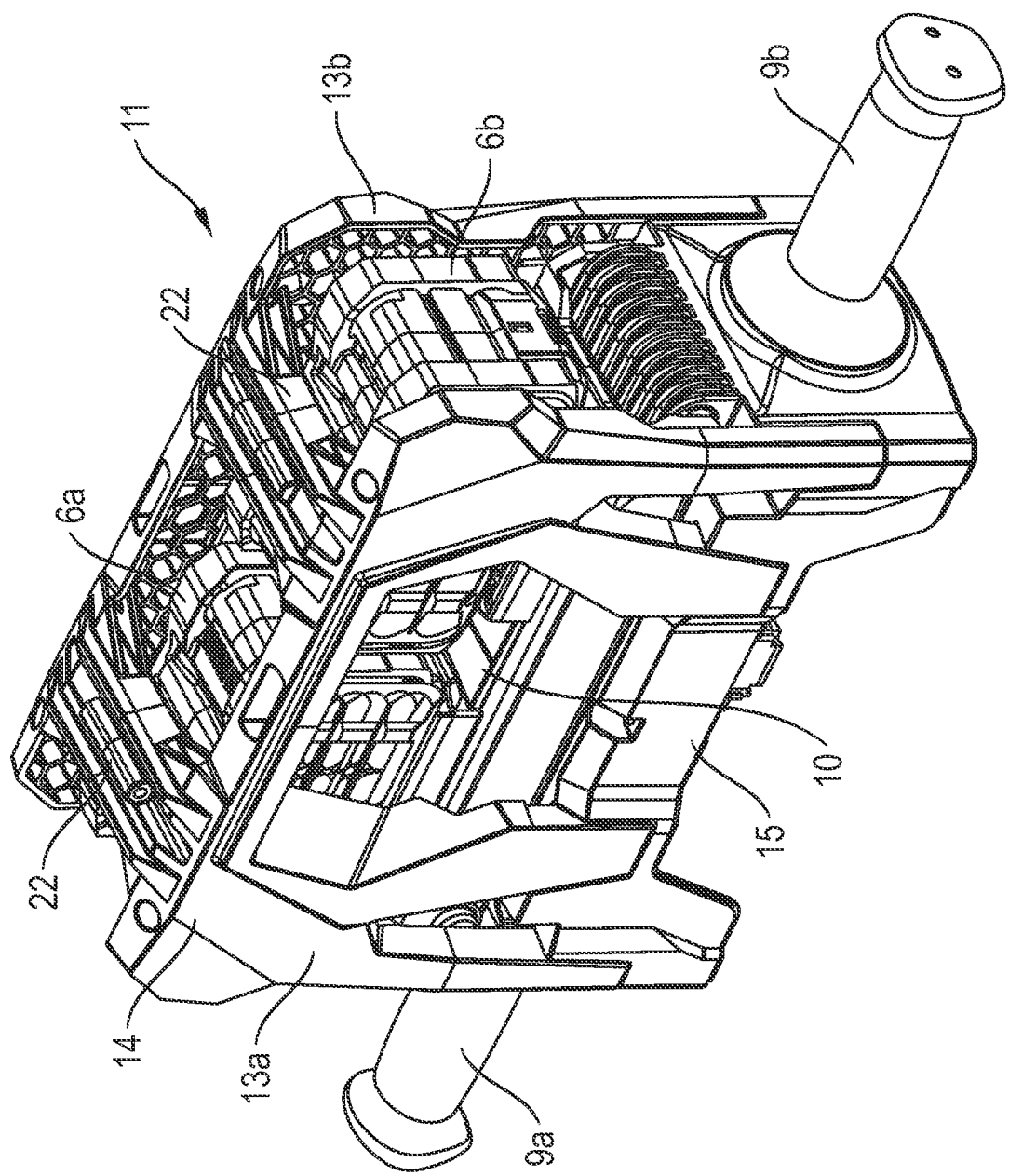
FIG. 8 shows a perspective view of the protective apparatus having a first and second side module according to a second embodiment.
Figure 9:
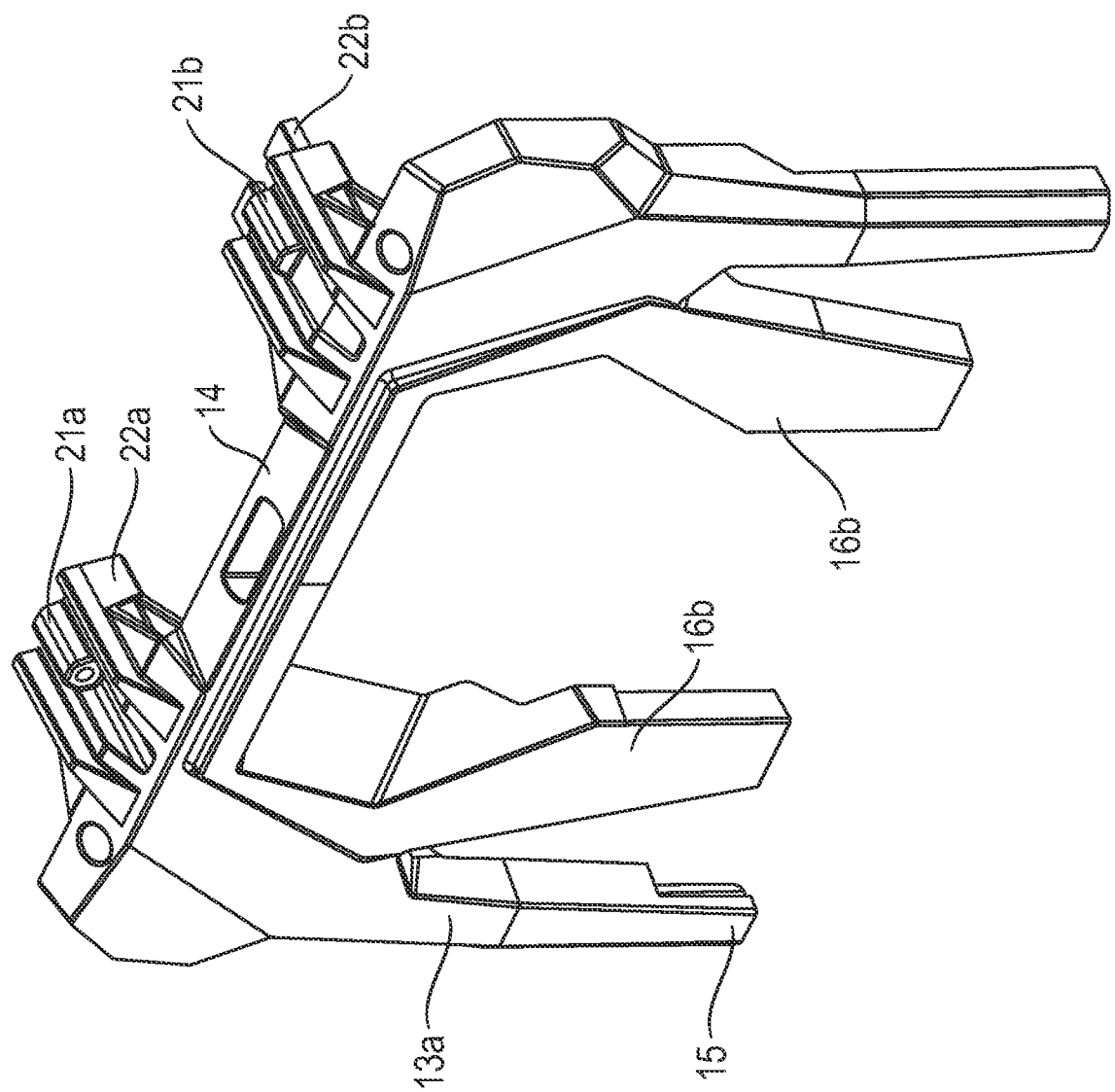
FIG. 9 shows a perspective view of a front side of the first side module according to the second embodiment.
Figure 10:
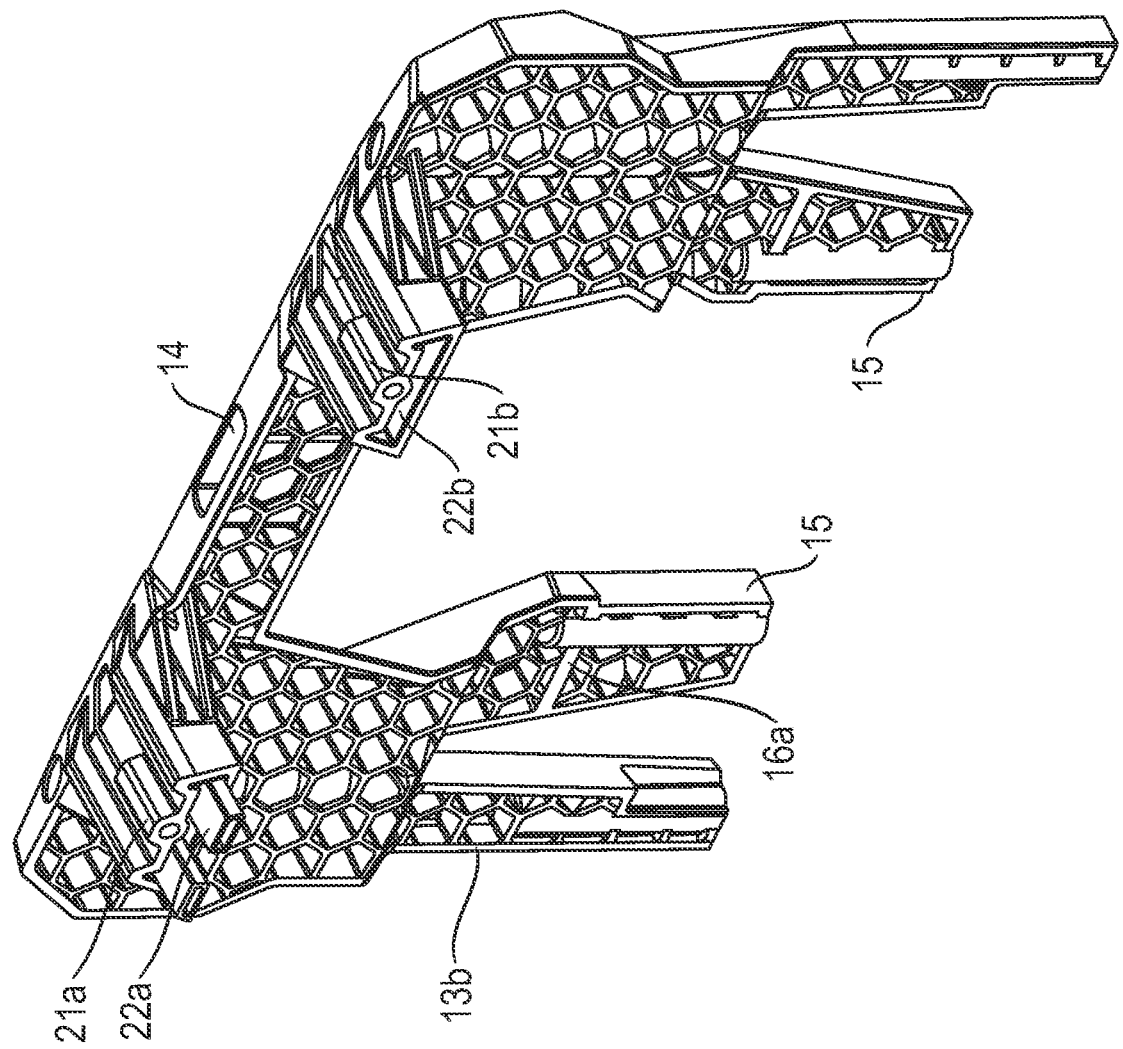
FIG. 10 shows a perspective view of a rear side of the second side module according to the second embodiment.

FIGS. 8 to 10 illustrate the protective apparatus 11 according to a second embodiment. The protective apparatus 11 according to the first embodiment is configured in a similar manner to the protective apparatus 11 according to the second embodiment. The configuration of the protective apparatus 11 according to the first embodiment differs from the configuration of the protective apparatus 11 according to the second embodiment primarily in that the first and second frame elements 13a, 13b are connected releasably to one another at the top side 14. For the releasable connection of the first and second frame elements 13a, 13b, use is made of a screw connection. As is apparent from each of FIGS. 9 and 10, both the first and the second frame element 13a, 13b each contain a first and second screw dome 21a, 21b. The screws are not shown in the figures. Furthermore, the first and second frame elements 13a, 13b are connected releasably to one another with the aid of a plug connection 22 at the top side 14. For this purpose, the first and second frame elements 13a, 13b each contain a first and second plug element 22a, 22b, with the result that the first and second frame elements 13a, 13b are connected releasably to one another.

LIST OF REFERENCE SIGNS

1 Power tool
2 Tool housing
4 Tool fitting device
6a First rechargeable battery
6b Second rechargeable battery
7a First side face
7b Second side face
8a Bottom end of the tool housing
8b Top end of the tool housing
9a First side handle
9b Second side handle
10 Interface device
11 Protective apparatus
12a First rechargeable-battery connection point
12b Second rechargeable-battery connection point
13 Frame
13a First frame element
13b Second frame element
14 Top side of the first/second frame element
15 Underside of the first/second frame element
16a Inner side of the first/second frame element
16b Outer side of the first/second frame element
17a First opening in the protective apparatus
17b Second opening in the protective apparatus
18 Clearance at the top side of the first/second frame element
19a First bearing surface
19b Second bearing surface
19c Third bearing surface
19d Fourth bearing surface
20 Auxiliary handle
21a First screw dome
21b Second screw dome
22 Plug connection
22a First plug element
22b Second plug element
E Plane through bearing surfaces
IV Internal volume
W Tool
X Auxiliary-handle axis
Y Side-handle axis
Z Working axis

What is claimed is:
1. A power tool comprising:
a first and second side handle, a side-handle axis extending through the first and second side handles;
a tool housing having an interface for releasably receiving and holding a first and second rechargeable battery, the side-handle axis arranged perpendicularly to a working axis extending through the tool housing; and
a protective apparatus for protecting the first and second rechargeable batteries, the protective apparatus having an internal volume for at least partially receiving the first and second rechargeable batteries;
the protective apparatus including a first frame element and a second frame element, wherein both the first and the second frame element each contain a top side and an underside, and wherein the first and second frame elements are connectable releasably to one another at the respective top side and the first and second frame elements are connectable releasably to the tool housing at the respective underside,
wherein the first frame element and second frame element, when connected to the tool housing, form a first opening and a second opening,
wherein the protective apparatus is configured such that the first battery is inserted through the first opening and mounted to the interface in a first direction and the second battery is inserted through the second opening and mounted to the interface in a second direction, opposite to the first direction.

2. The power tool as recited in claim 1 wherein the protective apparatus has a length of between 350 mm and 450 mm in a direction parallel to the side-handle axis.

3. The power tool as recited in claim 2 wherein the length is 400 mm.

4. The power tool as recited in claim 1 wherein the protective apparatus includes at least one bearing surface, wherein a plane extending through the at least one bearing surface is arranged parallel to the side-handle axis or perpendicularly to the working axis.

5. The power tool as recited in claim 4 wherein the plane is arranged parallel to the side-handle axis and perpendicularly to the working axis.

6. The power tool as recited in claim 1 further comprising at least one auxiliary handle arranged on the tool housing such that an auxiliary-handle axis extending through the at least one auxiliary handle is arranged parallel to the side-handle axis or perpendicularly to the working axis.

7. The power tool as recited in claim 6 wherein the at least one auxiliary handle is arranged parallel to the side-handle axis and perpendicularly to the working axis.

8. The power tool as recited in claim 7 wherein the at least one auxiliary handle is configured as a bow and contains a first end, a second end and a gripping region arranged between the first and second ends.

9. The power tool as recited in claim 8 wherein the auxiliary-handle axis is arranged substantially parallel to the side-handle axis.

10. The power tool as recited in claim 9 wherein the first and second ends of the at least one auxiliary handle are fastened to the first frame element.

11. The power tool as recited in claim 1 wherein the protective apparatus has a length in a direction parallel to the side-handle axis, the length corresponding at least to twice a largest length of the first rechargeable battery.

12. The power tool as recited in claim 1 wherein both the first and the second frame element each contain a first and second screw dome.

13. The power tool as recited in claim 12 wherein the first and second frame elements are connected releasably to one another with aid of a plug connection at the top side.

14. The power tool as recited in claim 1 wherein the first and second frame elements are connected releasably to one another with aid of a plug connection at the top side.

15. The power tool as recited in claim 1 wherein the first and second frame elements each contain a first and second plug element so that the first and second frame elements are connected releasably to one another.

16. A chipper hammer comprising the power tool as recited in claim 1.

* * * * *